(12) United States Patent
Goncalves et al.

(10) Patent No.: US 12,639,436 B2
(45) Date of Patent: May 26, 2026

(54) COORDINATING CYBER INTRUSTION DETECTION AND DATA PROTECTION FOR RESPONDING TO RANSOMWARE ATTACKS

(71) Applicant: Dell Products L.P., Hopkinton, MA (US)

(72) Inventors: David Goncalves, Acushnet, MA (US); Evan Jones, Glenville, NY (US)

(73) Assignee: Dell Products L.P., Hopkinton, MA (US)

( * ) Notice: Subject to any disclaimer, the term of this patent is extended or adjusted under 35 U.S.C. 154(b) by 199 days.

(21) Appl. No.: 18/366,782

(22) Filed: Aug. 8, 2023

(65) Prior Publication Data

US 2025/0053653 A1 Feb. 13, 2025

(51) Int. Cl.
G06F 21/56 (2013.01)
G06F 21/55 (2013.01)

(52) U.S. Cl.
CPC .......... G06F 21/566 (2013.01); G06F 21/554 (2013.01); G06F 2221/034 (2013.01)

(58) Field of Classification Search
CPC .............................. G06F 21/566; G06F 21/554
See application file for complete search history.

(56) References Cited

U.S. PATENT DOCUMENTS

| | | | |
|---|---|---|---|
| 2020/0042707 A1* | 2/2020 | Kucherov | ............. G06F 3/0683 |
| 2020/0334111 A1* | 10/2020 | Potnis | ................... G06F 16/128 |
| 2021/0271556 A1* | 9/2021 | Wilson | ................ G06F 11/1464 |
| 2021/0271559 A1* | 9/2021 | LeCrone | ................. G06F 3/067 |
| 2022/0092180 A1* | 3/2022 | Richardson | ........... G06F 11/108 |
| 2022/0138149 A1* | 5/2022 | Quinn | ................. G06F 11/1451 |
| | | | 707/649 |

\* cited by examiner

*Primary Examiner* — Meng Li
(74) *Attorney, Agent, or Firm* — Anderson Gorecki LLP

(57) ABSTRACT

Cyber intrusion detection (CID) and data protection (DP) are coordinated within a storage node to enable the capabilities of DP to be automatically and quickly utilized in response to detected threats to help protect data. CID sends an alert message to DP in response to detection of a ransomware attack or other threat. DP responds to the alert message by implementing at least one countermeasure, such as: generating new targetless snapshots of the storage objects under attack, the version data group of which the storage objects are members, or all storage objects maintained by the storage array; securing and/or preserving some of the targetless snapshots that existed before the infection; changing the targetless snapshot generation and retention schedule; and temporarily halting generation of new targetless snapshots.

20 Claims, 5 Drawing Sheets

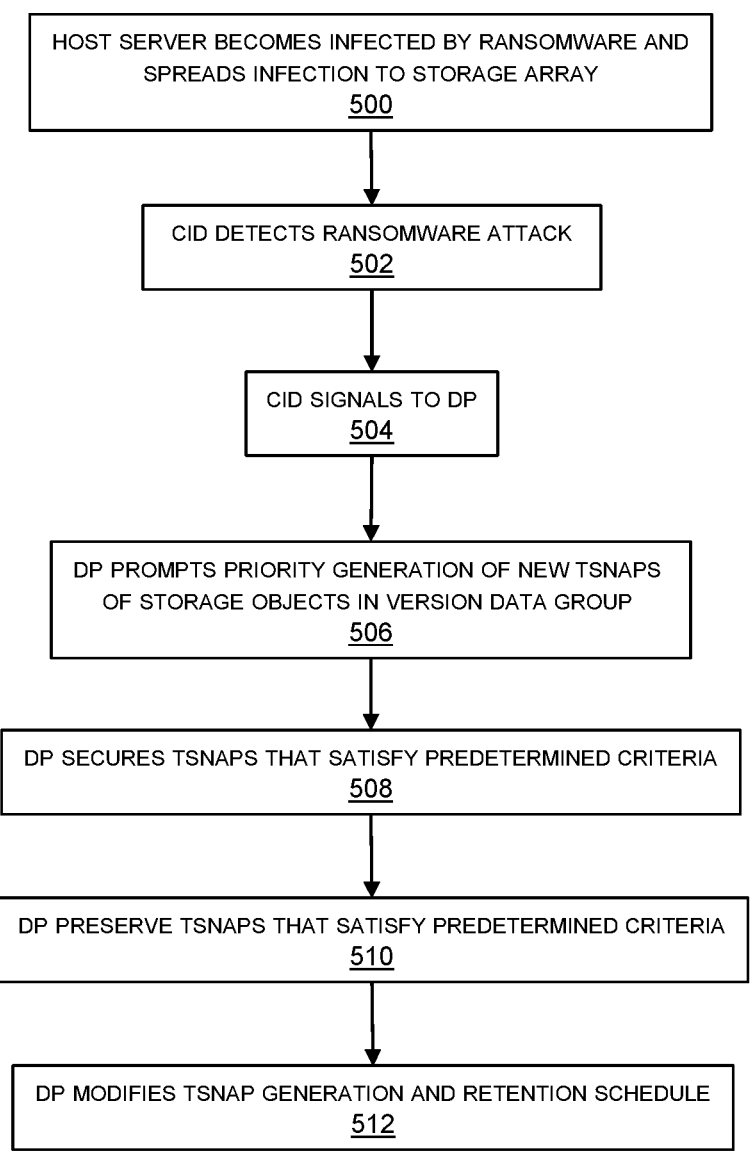

HOST SERVER BECOMES INFECTED BY RANSOMWARE AND
SPREADS INFECTION TO STORAGE ARRAY
500

CID DETECTS RANSOMWARE ATTACK
502

CID SIGNALS TO DP
504

DP PROMPTS PRIORITY GENERATION OF NEW TSNAPS
OF STORAGE OBJECTS IN VERSION DATA GROUP
506

DP SECURES TSNAPS THAT SATISFY PREDETERMINED CRITERIA
508

DP PRESERVE TSNAPS THAT SATISFY PREDETERMINED CRITERIA
510

DP MODIFIES TSNAP GENERATION AND RETENTION SCHEDULE
512

Figure 5

COORDINATING CYBER INTRUSTION DETECTION AND DATA PROTECTION FOR RESPONDING TO RANSOMWARE ATTACKS

TECHNICAL FIELD

The subject matter of this disclosure is generally related to computing and data storage equipment.

BACKGROUND

Data centers sometimes include clusters of servers and data storage nodes that are interconnected via switches. The servers run instances of host applications that support organizational processes such as email, accounting, inventory control, e-business, and engineering. Host application data is maintained by the storage nodes. Input-output commands (IOs) are sent from the host servers to the storage nodes to enable the host application instances to read and write the host application data. Host application data may be protected locally by the storage node and also remotely replicated by multiple storage nodes.

Ransomware is a type of malware that is designed to render data inaccessible so that the attacker can demand payment of a ransom in exchange for restoration of data accessibility. Ransomware can render data inaccessible by encrypting the data and by locking storage objects on which the data is stored. Within a data center, ransomware may initially infect only a single host server. However, the infection can spread from the host server to the storage arrays, so large data sets and multiple host application instances and host servers can be adversely affected by a ransomware attack via a single host server.

SUMMARY

A method in accordance with some implementations comprises detecting, by cyber intrusion detection running on a storage array, a ransomware attack; signaling, from cyber intrusion detection to data protection running on the storage array, an alert indicating that the ransomware attack has been detected; and automatically performing, by data protection, at least one action to protect data in response to the alert.

An apparatus in accordance with some implementations comprises a storage node comprising non-volatile storage containing data associated with storage objects and existing targetless snapshots of the storage objects, at least one compute node with a processor and memory, cyber intrusion detection configured to detect a ransomware attack and generate an alert that indicates that the ransomware attack has been detected, and data protection configured to automatically perform at least one action to protect the data in response to the alert.

In accordance with some implementations, a non-transitory computer-readable storage medium stores instructions that are executed by a computer to perform a method comprising detecting, by cyber intrusion detection running on a storage array, a ransomware attack; signaling, from cyber intrusion detection to data protection running on the storage array, an alert indicating that the ransomware attack has been detected; and automatically performing, by data protection, at least one action to protect data in response to the alert.

This summary is not intended to limit the scope of the claims or the disclosure. All examples, embodiments, aspects, implementations, and features can be combined in any technically possible way. Method and process steps may be performed in any order.

BRIEF DESCRIPTION OF THE FIGURES

FIG. 5 illustrates a method for coordinating cyber intrusion detection and data protection coordinate to respond to a ransomware attack.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features, such as abstractions of tangible features. The term "physical" refers to tangible features that possibly include, but are not limited to, electronic hardware. For example, multiple virtual computers could operate simultaneously on one physical computer. The term "logic" refers to special purpose physical circuit elements, firmware, software, computer instructions that are stored on a non-transitory computer-readable medium and implemented by multi-purpose tangible processors, and any combinations thereof. Embodiments of the inventive concepts are described as being implemented in a data storage system that includes host servers and a storage array. Such implementations are not limiting. Those of ordinary skill in the art recognize that there are a wide variety of implementations of the inventive concepts within the scope of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
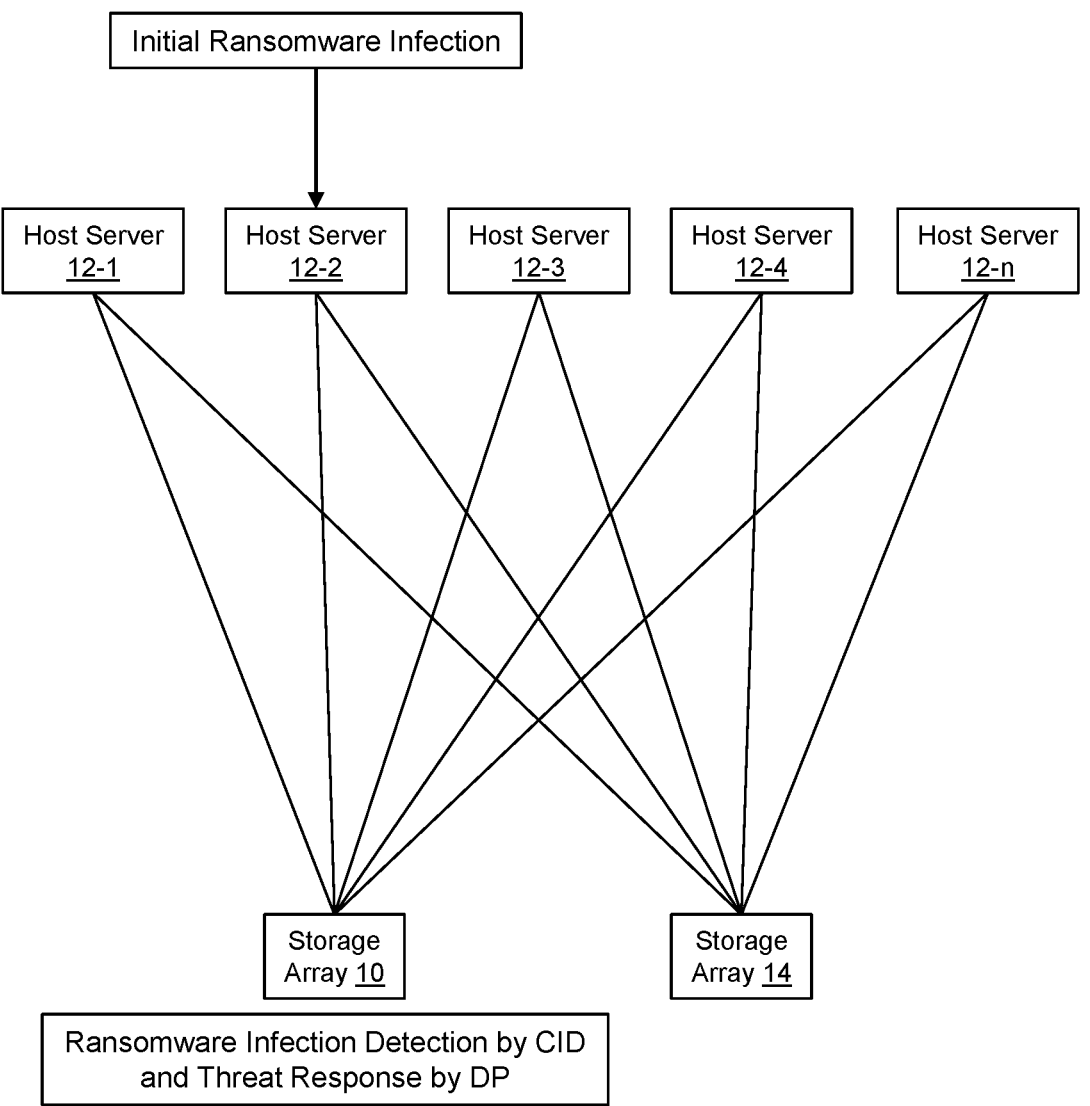
FIG. 1 illustrates a data center in which cyber intrusion detection and data protection of a storage array coordinate to respond to a ransomware attack.

FIG. 1 illustrates a data center in which cyber intrusion detection and data protection of a storage array coordinate to respond to a ransomware attack. The data center includes multiple storage arrays 10, 14 and host servers 12-1, 12-2, 12-3, and 12-4 through 12-n. The ransomware attack begins with an infection of host server 12-2. For example, the operating system of host server 12-2 may become infected through communication with a compromised client computer. That infection is spread to storage array 10 from host server 12-2. For example, host server 12-2 may start sending IOs to encrypt data on storage objects maintained by the storage array, lock those storage objects, and transfer malicious code to the storage array. Storage array 10 includes cyber intrusion detection that detects ransomware attacks using any of a wide variety of techniques. For example, cyber intrusion detection may detect ransomware attacks by identifying suspicious IO activity or suspicious IO data. The storage array also includes data protection that provides data protection that is local to the storage array, such as by periodically generating targetless snapshots of storage objects. Cyber intrusion detection and data protection functions have previously been viewed as unrelated functions. In accordance with the present disclosure, cyber intrusion detection sends an alert message to data protection in response to detection of a ransomware attack or other threat. Data protection responds to the alert message by implementing one or more countermeasures to protect the host application data. For example, data protection may immediately generate new targetless snapshots of the storage objects under attack, the version data group of which the storage objects are members, or all storage objects maintained by the storage array. Immediately generating new targetless snapshots helps to provide a recovery point that is prior to, but also temporally proximate to, the time when the infection is spread to the storage array. Data protection may secure and/or preserve some of the targetless snapshots that existed before the infection. Securing targetless snapshots prevents the secured targetless snapshots from being discarded to free resources to accommodate other functions such as servicing new write IOs when memory or storage resources are fully utilized. Preserving targetless snapshots prevents the preserved targetless snapshots from being automatically discarded according to a snapshot generation and retention schedule, e.g., a schedule for discarding targetless snapshots based on their age. Data protection may change the targetless snapshot generation and retention schedule. For example, new targetless snapshots may be generated more frequently or less frequently after the alert than specified by the targetless snapshot generation and retention schedule. In some embodiments the generation of new targetless snapshots is temporarily halted in response to the alert. Coordinating cyber intrusion detection with data protection enables the capabilities of data protection to be automatically and quickly utilized in response to detected threats to help protect data.

Figure 2:
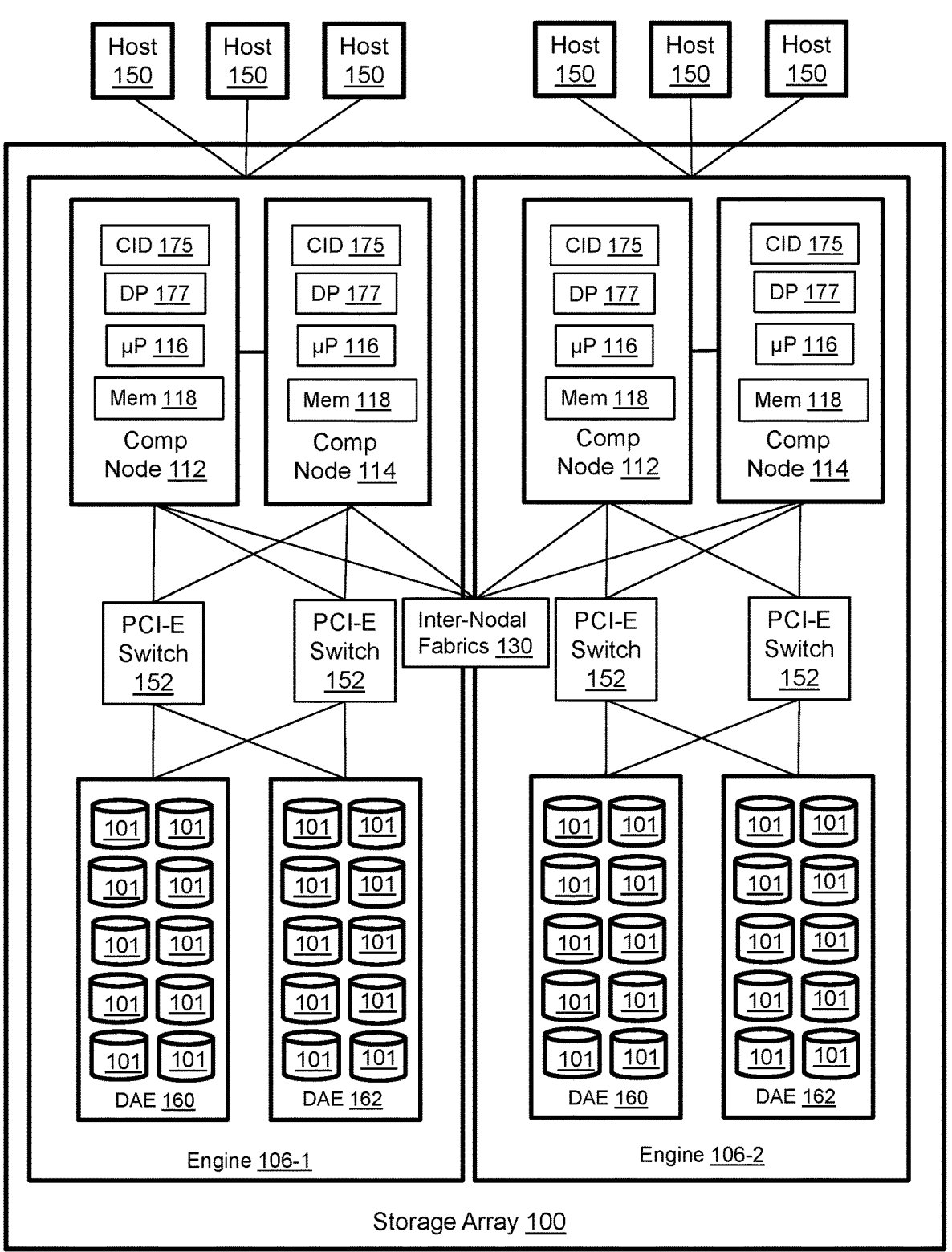
FIG. 2 illustrates a storage array in greater detail.

FIG. 2 illustrates an example of a storage array in greater detail. Storage array 100 is shown with two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. The processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130. Cyber intrusion detection is implemented by instances of cyber intrusion detection (CID) modules 175 of each compute node. Data protection is implemented by instances of data protection (DP) modules 177 of each compute node. The CID modules 175 and DP modules 177 may include one or more of special purpose electronic components, logic, and computer program code loaded into the memory 118 from the managed drives 101 and run on the processors 116.

Figure 3:
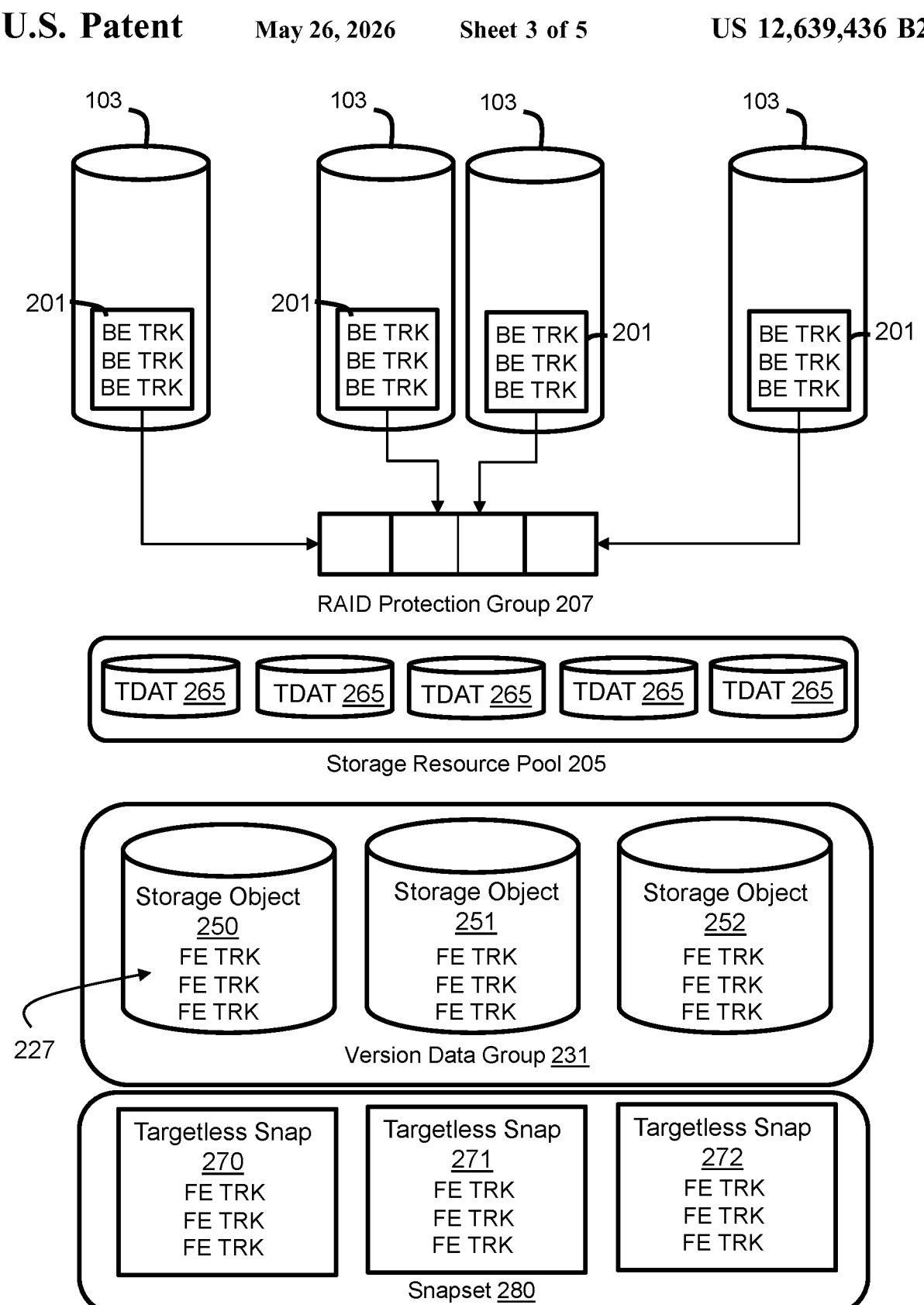
FIG. 3 illustrates how host application data is organized relative to the managed drives.

Referring to FIGS. 2 and 3, data that is created and used by instances of the host applications running on the host servers 150 is maintained on the managed drives 101. The managed drives are not discoverable by the host servers, so the storage array creates logical production storage objects 250, 251, 252 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on various managed drives 101.

IO services emulations running on the processors of the compute nodes maintain metadata that maps between the LBAs of the production storage objects 250, 251, 252 and physical addresses on the managed drives 101 in order to process IOs from the host servers. The basic allocation unit of storage capacity that is used by the compute nodes 112, 114 to access the managed drives is a back-end track (BE TRK). The managed drives are organized into same-size splits 201, each of which may contain multiple BE TRKs. Although individual drives can be configured as RAID group members, in the illustrated example a grouping of splits 201 from different managed drives is used to create a RAID protection group 207 with each split containing a protection group member. Specifically, splits from drives 101 are used to create RAID protection groups, such as RAID-5 or RAID-6. A storage resource pool 205 is a type of storage object that includes a collection of protection groups of the same RAID level on thinly provisioned logical data devices (TDATs) 265 that are used to create the production storage objects 250, 251, 252. The host application data is logically stored in front-end tracks (FE TRKs) on the production storage objects. The FE TRKs of the production storage objects are mapped to the BE TRKs on the managed drives and vice versa by tables and pointers that are maintained in the shared memory. A host application image contains all the production storage objects associated with an individual host application.

The DP modules 177 perform data protection locally relative to the storage array by generating targetless snapshots of storage objects. Each targetless snapshot represents the state of a storage object at a prior point in time and thus provides a recovery point for that storage object. A corrupted, maliciously locked, or maliciously encrypted storage object can be restored to an uncorrupted, unlocked, or unencrypted recovery point represented by an existing targetless snapshot, i.e., a targetless snapshot created before the corresponding storage object was affected by the ransomware attack. A snapset 280 of targetless snapshots 270, 271, 272 includes targetless snapshots of each storage object in a version data group 231. In the illustrated example, version data group 231 includes storage objects 250, 251, 252 and targetless snapshot 270 is a snapshot of storage object 250, targetless snapshot 271 is a snapshot of storage object 251, and targetless snapshot 272 is a snapshot of storage object 252. All targetless snapshots in a snapset instance have the same recovery point. The storage objects of the version data group may all be associated with the same host application image, so maliciously encrypted data of a particular host application can be restored to a common recovery point using a corresponding snapset.

Figure 4:
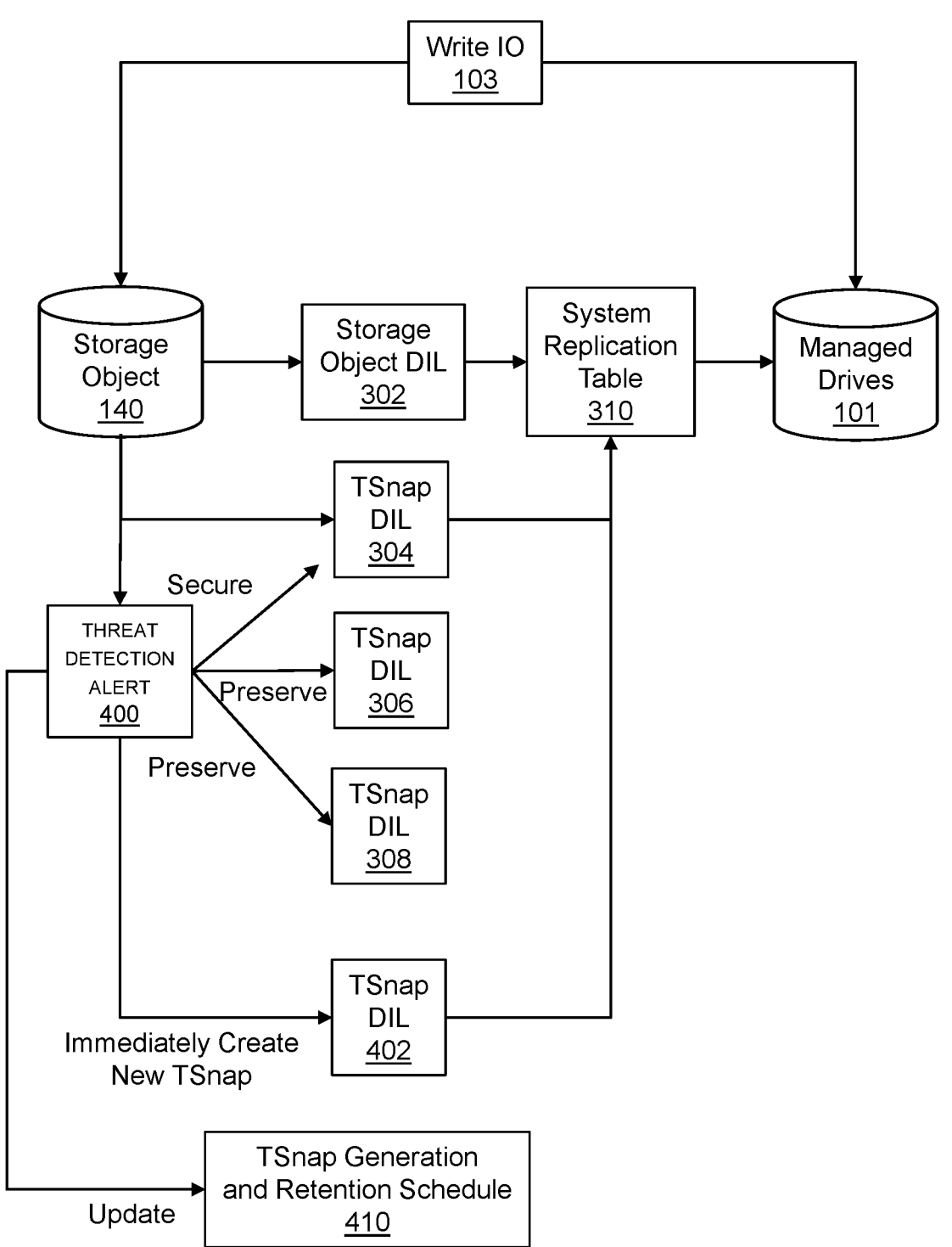
FIG. 4 illustrates creation and management of targetless snapshots.

FIG. 4 illustrates creation and management of targetless snapshots. Targetless snapshots are created by updating tables in response to data changes caused by IOs from the host servers. Write IO 103 is logically directed to storage object 140 and physically directed to managed drives 101. Replication data pointer (RDP) tables associate LBAs of storage object 140 and targetless snapshots thereof with addresses of tracks on the managed drives 101. At least one direct index lookup (DIL) table is associated with each represented storage object. In the illustrated example, a current DIL table 302 represents the current state of storage object 140 and targetless snapshot DIL tables 304, 306, 308 represent a time-series of targetless snapshots of storage object 140 generated at intervals specified by the targetless snapshot generation and retention schedule that is implemented in the absence of a detected threat. Each TSnap DIL table is associated with a different recovery point for the storage object. Each DIL table includes separate entries for same-sized address range portions of the represented storage object, e.g., tracks or LBAs. Each utilized DIL table entry includes a source volume identifier that identifies storage object 140 as the source volume, and the reference number of the described track. Each DIL table is organized into zones of same-sized groups of entries. The zones may be sequentially numbered and be associated with groups of sequentially numbered tracks of the source volume. A system replication table (SRT) 310 has entries that map backend track allocations for the storage object 140 on the managed drives 101. Each utilized DIL table entry maps a source volume track to an entry in the SRT, and thus to a backend track on the managed drives. The storage array may simultaneously maintain many DIL tables and SRTs and discard selected TSnap DIL tables according to the retention schedule. Collectively, the DIL tables and SRTs are referred to as RDP tables and the entries therein are stored in RDP nodes in RDP pages in the shared memory and/or managed drives.

In response to a threat detection alert 400 from a CID module, the DP module causes a new targetless snapshot of storage object 140 to be immediately generated by creating and populating a new TSnap DIL table 402 mapped to SRT 310. The DP module secures TSnap DIL table 304, e.g., because it is the most recently generated targetless snapshot and therefore potentially provides the most valuable recovery point. The DP module preserves TSnap DIL table 306 and TSnap DIL table 308, e.g., because they are likely to be unaffected by the ransomware attack and might otherwise be discarded due to age. TSnap DIL table 304 may also be preserved. The DP module may change the targetless snapshot generation and retention schedule 410, such as by increasing the frequency of generation of new targetless snapshots to create more recovery points or decreasing the frequency of generation of new targetless snapshots to avoid using resources to protect data that has already been affected by the ransomware attack. In some embodiments the generation of new targetless snapshots is temporarily halted until the threat has been resolved.

FIG. 5 illustrates a method for coordinating cyber intrusion detection and data protection to respond to a ransomware attack. In the illustrated example the method is automatically implemented in response to a host server becoming infected by ransomware and spreading the infection to the storage array as shown in block 500. However, the infection could begin anywhere in the data center. In step 502, cyber intrusion detection running on the storage array detects the infection, e.g., as a ransomware attack. In step 504, the cyber intrusion detection signals an alert to data protection running on the same storage array as cyber intrusion detection. In step 506, data protection prompts priority generation of new targetless snapshots of selected storage objects, e.g., creation of a snapset of the storage objects in a version data group targeted by the detected attack. In step 508, data protection secures targetless snapshots that satisfy predetermined criteria. For example, and without limitation, targetless snapshots of the most recently created snapset of the storage objects in the version data group targeted by the detected attack may be secured. Securing targetless snapshots prevents the secured targetless snapshots from being automatically discarded to free resources to accommodate new write IOs when memory or storage resources are fully utilized. In step 510, data protection preserves targetless snapshots that satisfy predetermined criteria. For example, and without limitation, targetless snapshots of the snapsets of the storage objects in the version data group targeted by the detected attack may be preserved. Preserving targetless snapshots prevents the preserved targetless snapshots from being automatically discarded according to the snapshot retention schedule. In step 512, data protection modifies the targetless snapshot generation and retention schedule. For example, the frequency of generation of new targetless snapshots may be increased to create more recovery points or decreased to avoid using resources to protect data that has already been affected by the ransomware attack. In some embodiments the generation of new targetless snapshots is temporarily halted. The steps are not necessarily performed in the illustrated order and some steps may be omitted in different embodiments.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:

1. A method for coordinating independent cyber intrusion detection and data protection functions in a storage array, the method comprising:

data protection periodically generating targetless snapshots of a plurality of storage objects of a first version data group according to a targetless snapshot generation and retention schedule maintained by data protection, each storage object being a logical disk drive uniquely associated with a first host application and the storage objects of the first version data group storing all data associated with the first host application, wherein the storage array maintains a plurality of version data groups;

detecting, by cyber intrusion detection running on a storage array, a ransomware attack directed at the first version data group and originating from malicious code running on a remote host server;

signaling, from cyber intrusion detection to data protection running on the storage array, an alert indicating that the ransomware attack directed at the first version data group has been detected; and automatically performing, by data protection running on the storage array, at least one action to protect data of the first version data group in response to the alert, including changing the targetless snapshot generation and retention schedule by:

increasing frequency of generation of new targetless snapshots of a first storage object of the first version data group to create more recovery points responsive to a determination that the first storage object has not been affected by the ransomware attack; and decreasing frequency of generation of new targetless snapshots of a second storage object of the first version data group responsive to a determination that the second storage object has already been affected by the ransomware attack, whereby the independent storage array functions are coordinated to detect ransomware attacks on a specific version data group that originate from malicious code running on remote host servers and use data protection to protect data of selected storage objects of the specific version data group without external monitoring and without external prompting to perform specific data protection actions.

2. The method of claim 1 further comprising data protection prompting priority generation of at least one new targetless snapshot of the first storage object in response to the alert and the determination that the first storage object has not been affected by the ransomware attack.

3. The method of claim 2 further comprising generating new targetless snapshots of all storage objects of a second version data group targeted by the ransomware attack in response to the alert and a determination that the storage objects of the second version data group have not been affected by the ransomware attack.

4. The method of claim 1 further comprising data protection securing at least one existing targetless snapshot of the first storage object in response to the alert and the determination that the first storage object has not been affected by the ransomware attack.

5. The method of claim 1 further comprising data protection preserving at least one existing targetless snapshot of the first storage object in response to the alert and the determination that the first storage object has not been affected by the ransomware attack.

6. The method of claim 1 further comprising data protection modifying the targetless snapshot generation and retention schedule in response to the alert by increasing retention time of targetless snapshots of the first storage object in response to the determination that the first storage object has not been affected by the ransomware attack.

7. The method of claim 6 further comprising data protection modifying the targetless snapshot generation and retention schedule in response to the alert by halting generation of new targetless snapshots of the second storage object in response to the determination that the second storage object has been affected by the ransomware attack.

8. A non-transitory computer-readable storage medium storing instructions that are executed by a computer to perform a method for coordinating independent cyber intrusion detection and data protection functions in a storage array, the method comprising:

data protection periodically generating targetless snapshots of a plurality of storage objects of a first version data group according to a targetless snapshot generation and retention schedule maintained by data protection, each storage object being a logical disk drive uniquely associated with a first host application and the storage objects of the first version data group storing all data associated with the first host application, wherein the storage array maintains a plurality of version data groups;

detecting, by cyber intrusion detection running on a storage array, a ransomware attack directed at the first version data group and originating from malicious code running on a remote host server;

signaling, from cyber intrusion detection to data protection running on the storage array, an alert indicating that the ransomware attack directed at the first version data group has been detected; and automatically performing, by data protection running on the storage array, at least one action to protect data of the first version data group in response to the alert, including changing the targetless snapshot generation and retention schedule by:

increasing frequency of generation of new targetless snapshots of a first storage object of the first version data group to create more recovery points responsive to a determination that the first storage object has not been affected by the ransomware attack; and decreasing frequency of generation of new targetless snapshots of a second storage object of the first version data group responsive to a determination that the second storage object has already been affected by the ransomware attack, whereby the independent storage array functions are coordinated to detect ransomware attacks on a specific version data group that originate from malicious code running on remote host servers and use its data protection to protect data of selected storage objects of the specific version data group without external monitoring and without external prompting to perform specific data protection actions.

9. The non-transitory computer-readable storage medium of claim 8 further comprising data protection prompting priority generation of at least one new targetless snapshot of the first storage object in response to the alert and the determination that the first storage object has not been affected by the ransomware attack.

10. The non-transitory computer-readable storage medium of claim 9 further comprising generating new targetless snapshots of all storage objects of a second version data group targeted by the ransomware attack in response to the alert and a determination that the storage objects of the second version data group have not been affected by the ransomware attack.

11. The non-transitory computer-readable storage medium of claim 8 further comprising data protection securing at least one existing targetless snapshot of the first storage object in response to the alert and the determination that the first storage object has not been affected by the ransomware attack.

12. The non-transitory computer-readable storage medium of claim 8 further comprising data protection preserving at least one existing targetless snapshot of the first storage object in response to the alert and the determination that the first storage object has not been affected by the ransomware attack.

13. The non-transitory computer-readable storage medium of claim 8 further comprising data protection modifying the targetless snapshot generation and retention schedule in response to the alert by increasing retention time of targetless snapshots of the first storage object in response to the determination that the first storage object has not been affected by the ransomware attack.

14. The non-transitory computer-readable storage medium of claim 13 further comprising data protection modifying the targetless snapshot generation and retention schedule in response to the alert by halting generation of new targetless snapshots of the second storage object in response to the determination that the second storage object has been affected by the ransomware attack.

15. An apparatus comprising:

a storage node comprising non-volatile storage containing data associated with a plurality of storage objects of a first version data group, other storage objects associated with other version data groups, and existing targetless snapshots of the storage objects of the first version data group, at least one compute node with a processor and memory, cyber intrusion detection configured to detect a ransomware attack on the first version data group originating from malicious code running on a remote host server and generate an alert that indicates that the ransomware attack on the first version data group has been detected, and data protection running on the storage array independent from the cyber intrusion detection and configured to automatically periodically generate targetless snapshots of the plurality of storage objects of the first version data group according to a targetless snapshot generation and retention schedule maintained by data protection and perform at least one action to protect the data of the first version data group in response to the alert, including changing the targetless snapshot generation and retention schedule by:

increasing frequency of generation of new targetless snapshots of a first storage object of the first version data group to create more recovery points responsive to a determination that the first storage object has not been affected by the ransomware attack; and decreasing frequency of generation of new targetless snapshots of a second storage object of the first version data group responsive to a determination that the second storage object has already been affected by the ransomware attack, whereby the independent storage array functions are coordinated to detect ransomware attacks on a specific version data group that originate from malicious code running on remote host servers and use its data protection to protect data of selected storage objects of the specific version data group without external monitoring and without external prompting to perform specific data protection actions.

16. The apparatus of claim 15 further comprising data protection configured to prompt priority generation of at least one new targetless snapshot of the first storage object in response to the alert and the determination that the first storage object has not been affected by the ransomware attack.

17. The apparatus of claim 15 further comprising data protection configured to secure at least one of the existing targetless snapshots of the first storage object in response to the alert and the determination that the first storage object has not been affected by the ransomware attack.

18. The apparatus of claim 15 further comprising data protection configured to preserve at least one existing targetless snapshot of the first storage object in response to the alert and the determination that the first storage object has not been affected by the ransomware attack.

19. The apparatus of claim 15 further comprising data protection configured to modify a targetless snapshot generation and retention schedule in response to the alert by increasing retention time of targetless snapshots of the first storage object in response to the determination that the first storage object has not been affected by the ransomware attack.

20. The apparatus of claim 19 further comprising data protection configured to modify the targetless snapshot generation and retention schedule in response to the alert by halting generation of new targetless snapshots of the second storage object in response to the determination that the second storage object has been affected by the ransomware attack.

* * * * *